Sept. 2, 1924.

F. L. KOHLHASE

ELECTRIC GRILL

Filed Oct. 27, 1923    2 Sheets-Sheet 1

1,506,909

Inventor:
Frank L. Kohlhase
By Williams, Bradbury,
McCabe & Pierce Attys

Sept. 2, 1924. 1,506,909
F. L. KOHLHASE
ELECTRIC GRILL
Filed Oct. 27, 1923 2 Sheets-Sheet 2
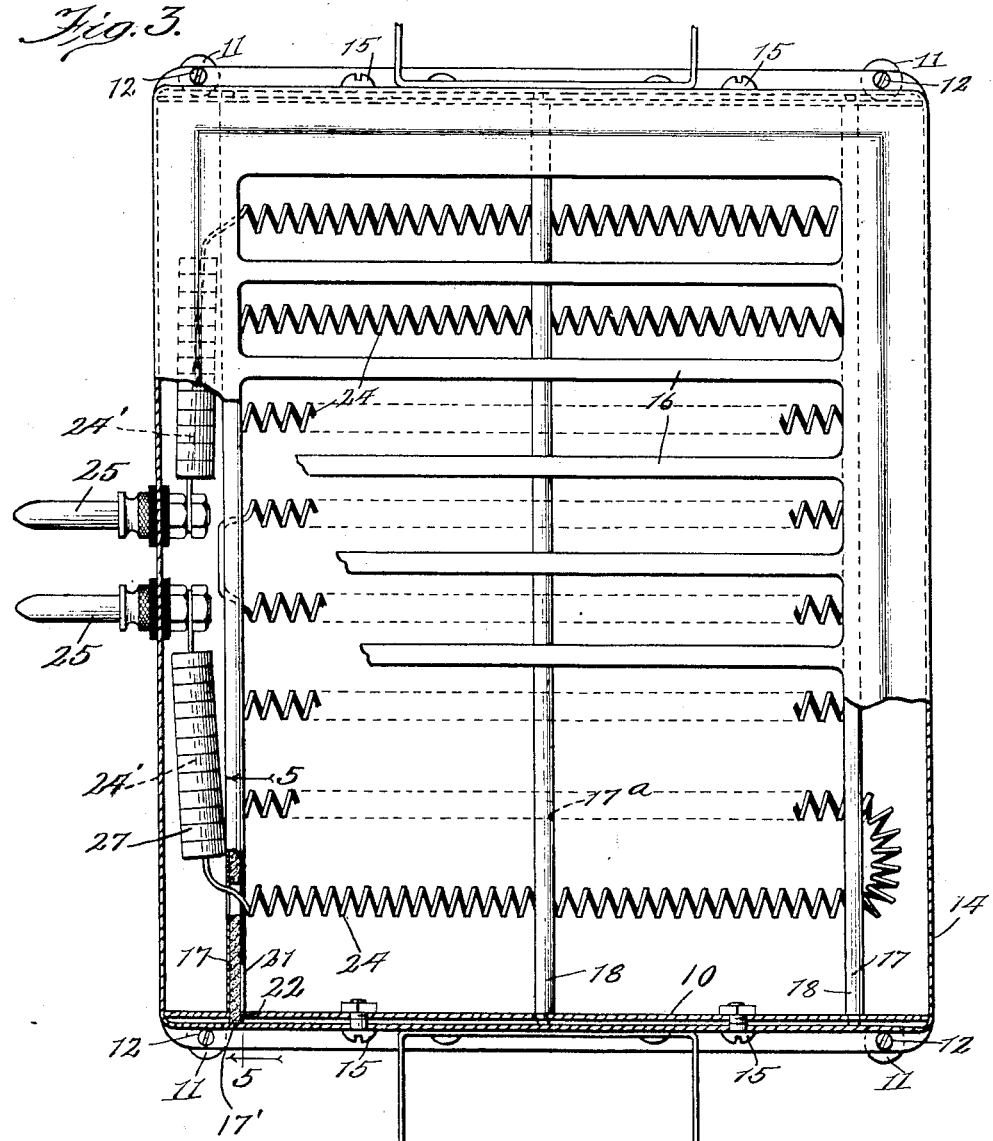
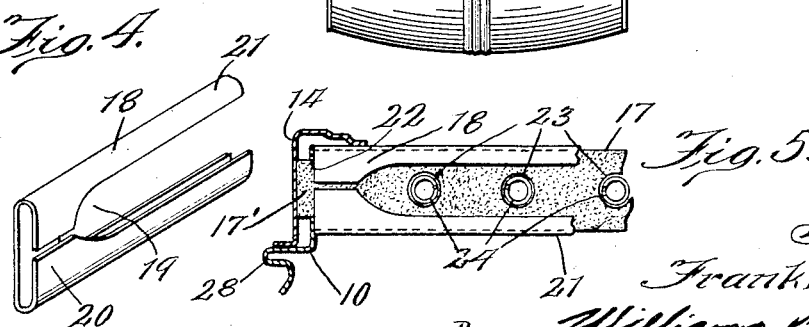
Inventor:
Frank L. Kohlhase Patented Sept. 2, 1924.

1,506,909

UNITED STATES PATENT OFFICE.

FRANK L. KOHLHASE, OF CHICAGO, ILLINOIS, ASSIGNOR TO NATIONAL STAMPING & ELECTRIC WORKS, OF CHICAGO, ILLINOIS, A CORPORATION OF ILLINOIS.

ELECTRIC GRILL.

Application filed October 27, 1923. Serial No. 671,065.

*To all whom it may concern:*

Be it known that I, FRANK L. KOHLHASE, a citizen of the United States, and resident of Chicago, in the county of Cook and State of Illinois, have invented a certain new and useful Improvement in Electric Grills, of which the following is a full, clear, concise, and exact description, reference being had to the accompanying drawings, forming a part of this specification.

My invention relates to electric grills, and more particularly to those types of grills wherein a grating above the heating coil forms a toaster, while below the heating coil a cooking drawer or tray is supported.

One object of my invention is to provide an electric grill of such a type having two such drawers, one below the other, so arranged that when the upper drawer is withdrawn, the lower drawer is also withdrawn so that the operator in replacing it will think to replace the lower drawer in the upper position so that the drawer will act as a reflector for reflecting the heat of the coil upwardly to the toaster.

Another object of my invention is the provision of an insulated support for the electric heating coil of a toaster whereby a thin strip of more or less brittle insulating material, such as commercial lava, may be employed without danger from breakage.

A still more general object of my invention is the provision of a device of this kind which may be very cheaply manufactured and at the same time be very durable.

Other objects, features and advantages of my invention are to be found in the following description and from the accompanying drawings therein referred to. In the drawings—

Figure 3 is a plan view of the grill, certain parts thereof being broken into horizontal section;

Figure 4 is a detail in perspective of one end of the frame for the insulating strips, and Figure 5 is a fragmentary view taken on the line 5—5 of Figure 3.

Figure 1:
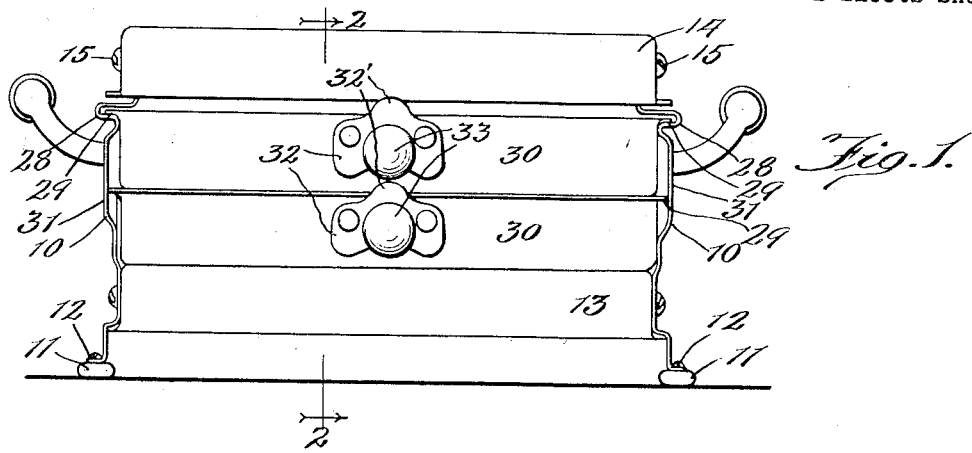
Figure 1 is a front elevation of an electric grill embodying my invention.

The supporting frame of the grill comprises a pair of end plates 10—10, the grill resting upon rubber feet 11—11 secured to the bottom flanges 12 of the end plates. An inverted rectangular pan 13 is bolted or otherwise secured at its end to the end plates 10 to form a lower brace for the end plates, and also to form a supporting means for the lower tray as will later be described. The upper ends of the end plates are held together and braced by means of a grill cap or cover 14 secured to the end plates by bolts 15—15, the top side of the cover being cut away, as shown in Figure 3, to form grid bars 16 for the toaster.

Disposed immediately beneath the toaster cover 14 is a pair of spaced strips 17—17 of an insulating material, such as commercial lava, extending the length of the coil between the two end plates 10—10. For each of the insulating strips 17, I provide a frame 18 which comprises a single strip of sheet metal bent about the strip to envelop its lateral sides and edges, the lateral sides of the frame being cut away as indicated at 19 except at the ends of the frame where the frame completely envelops the strip as shown at 20. By thus cutting away the sides of the strip, a channel member 21 is left to hold each edge of the strip 17 so that although under hard usage the brittle insulation may crack or tend to warp, the channel members 21 will retain the broken strip in position. The end of each insulating strip 17 is provided with a reduced shoulder 17' which extends beyond the end of the frame 18 and enters a slot 22 at the upper end of the adjacent end plate 10, as shown in Figure 5. Once the insulating strips 17—17 have been assembled and the cover placed over the upper edges of the end plates and secured thereto by the bolts 15, the insulating strips are obviously locked in place.

Figure 2:
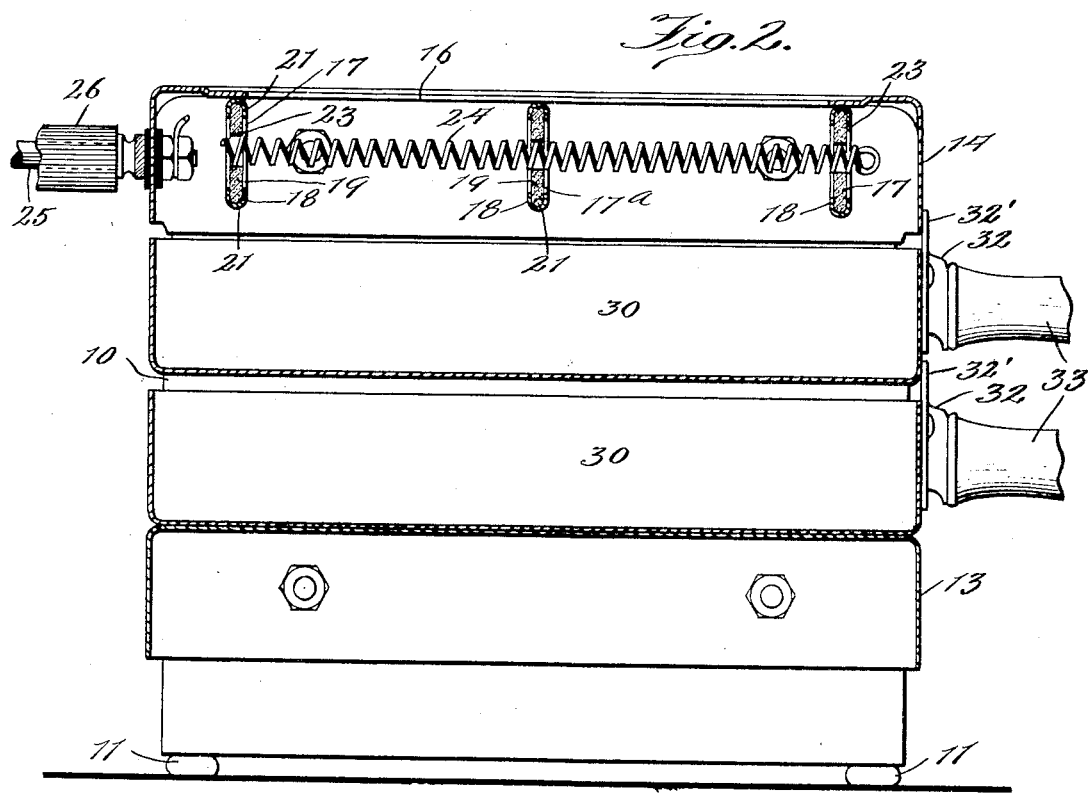
Figure 2 is a transverse vertical section taken on the line 2—2 of Figure 1, but on an enlarged scale.

As shown in Figures 2 and 5, the insulating strips 17 are provided with a plurality of aligned spaced holes 23—23. A suitable electric heating coil or other heating filament 24 is laced back and forth through these holes 23 whereby the heating element is strung upon the insulating strips 17 and supported thereby. I prefer to provide a similar insulating strip 17$^a$ midway between the strips 17—17 for aiding in the support of the heating coils to prevent their sagging and to hold them in alignment. The ends of the heating coil are preferably brought out as uncoiled wires 24' to suitable terminal plugs 25 for co-operation with the usual terminal socket 26 of the extension cord. The wires 24' are preferably insulated by means of a plurality of centrally perforated insulating discs 27 strung thereupon.

Each end plate 10, a short distance below the heating coils, is provided with an outwardly extending loop 28, the lower side of which forms a shoulder upon which rides an integrally formed end flange 29 of a cooking drawer or tray 30 whereby the latter is slidably mounted in the frame. A second and similarly formed drawer 30 is disposed immediately beneath the upper drawer and rests upon the inverted pan 13, the flanges 29 of the lower drawer extending into an offset portion 31 of the end plates.

When the upper tray is empty, the upper surface of the bottom thereof will act as a reflector to reflect the heat from the coils 24 upwardly to intensify the heat at the toaster grid 16.

When a user withdraws the upper drawer, the normal tendency would be to allow the lower drawer to remain in its lower position where the advantage of this heat reflection would be lost, owing to the great distance between the bottom of the lower pan and the heating coils. However, if the second drawer is withdrawn from its lower position and replaced in the upper position previously occupied by the first drawer, the bottom thereof will be sufficiently near the heating coils to be effective as a reflecting surface. In order to insure that this change is made, I provide the stamping 32, whereby the handle 33 is secured to the front side of the drawer, with an upwardly extending lug 32' which, in the lower drawer, is adapted to abut the lower front edge of the upper drawer. Thus, when the upper drawer is withdrawn, the lower front edge thereof will engage the lug 32 extending upwardly from the lower drawer so that the lower drawer is withdrawn along with the upper drawer. It is not necessary that the lower drawer be completely withdrawn, but it should be withdrawn sufficiently far so that the user will have to replace it and in so doing will remember to replace it in the upper position rather than in the lower position. As shown in Figure 2, the upwardly projecting lug 32' of the upper drawer abuts the forward flange of the cover 14 to form a stop for the upper drawer, and by means of the lower lug 32' also indirectly forms a stop for the lower drawer.

If desired, the operator instead of replacing the lower drawer in the upper position may invert the lower drawer and replace it so that the end flanges 29 thereof rest at the bottom of the offset portions 31 of the end plates, whereby the bottom surface of the bottom of the drawer will lie uppermost and quite close to the heating coils so that it will form a satisfactory reflecting surface. This is especially desirable in some instances where the outer surface of the drawer retains a higher polish than the inner surface which becomes dulled by contact with the food being cooked.

While in disclosing my invention, I have shown but this particular construction of an electric grill, it is to be understood that certain changes may be made without departing from the spirit of my invention.

What I claim is:

1. A grill comprising an electric heating element, a frame for supporting said element, and a pair of vertically stacked trays slidably supported by said frame beneath said element, said trays, when empty, acting as heat reflectors for said element, and means whereby, when the upper of said trays is withdrawn, the lower is also withdrawn, for the purpose described.

2. An electric stove comprising a frame, an electric heating element supported by said frame, a grill supported by said frame above said element, a cooking drawer slidably supported by said frame immediately below said element, a second cooking drawer slidably supported by said frame below said first drawer, and co-operating means on said drawers for withdrawing said second drawer when said first drawer is withdrawn.

3. In an electric cooking utensil, the combination of a frame comprising two end plates, an electric heating element supported by said frame, a tray having end flanges adapted to occupy either an upper or lower position in said frame, shoulders on said end plates upon which the end flanges of said tray are adapted to rest when said tray is in its upper position, and offset portions in said end plates for accommodating said end flanges when said tray is in its lower position.

4. In an electric grill, the combination of a frame comprising end plates, a shoulder across each end of said frame, a cooking tray having end flanges resting on said shoulders to slidably support said drawer, a second drawer supported on said frame directly beneath said first drawer and having similar flanges, said drawers being interchangeable, an electric heating coil supported on said frame immediately above said first drawer, a toaster grill immediately above said coil, said drawers, when empty and supported on said shoulders, acting as reflectors for said toaster grill, and co-operating means on said drawers whereby withdrawing the upper drawer will withdraw the lower for the purpose stated, although the lower drawer may be independently withdrawn.

5. In an electric grill, the combination of a frame comprising end plates, a shoulder across each end of said frame, a cooking tray having end flanges resting on said shoulders to slidably support said drawer, a second drawer supported on said frame directly beneath said first drawer and having similar flanges, said drawers being interchangeable, an electric heating coil supported on said frame immediately above said first drawer, a toaster grill immediately above said coil, said drawers, when empty and supported on said shoulders, acting as reflectors for said toaster grill, and an upwardly projecting lug on the front side of each of said drawers, said lug on the lower drawer engaging the side of the upper drawer whereby, when the upper drawer is withdrawn, the lower drawer is also withdrawn, for the purpose described.

6. In an electric grill, the combination of a frame comprising end plates, a tray supported on said end plates, a pair of spaced insulating supports extending between said plates, each of said supports comprising a strip of insulation and a metal frame for said strip extending the length thereof, a tongue at each end of said supports respectively, slots on said end frames into which said tongues enter, and a grill cover having marginal flanges for embracing the upper edges of said end plates on the outsides thereof for holding said tongues in said slots, a plurality of holes in said strips, and an electric heating element laced through said holes.

7. In an electric grill, the combination of a pair of spaced strips of insulation, a frame for each of said strips, said frame comprising an upper and a lower channel strip of metal between which said strip is disposed, said strip being extended from both ends of said frame as end tongues, supporting means for receiving said tongues of insulation, spaced holes in said strips, and an electric heating coil passing through said holes and being supported by said strips and frames.

8. In an electric grill, the combination of a pair of spaced strips of insulation, a frame for each of said strips, said frame comprising a single piece of sheet metal bent around the sides and edges of said strip to envelop the latter, the sides of said frame, except at the end thereof, being cut away leaving channel members extending the length of said strip at the edges thereof, said strip being extended from both ends of said frame as end tongues for supporting said strip and frame, a plurality of spaced holes in said strip at said cut away portions of said frame, and an electric heating coil strung through said holes.

9. In an electric cooking utensil, the combination of a frame comprising two end plates, a grill covering supported between the upper ends of said plates, an electric heating element supported adjacent said grill cover, and a pan completing the lower part of said frame, said pan being inverted and having its end walls rigidly fastened to said end plates.

10. In an electric cooking utensil, the combination of a frame comprising two end plates extending across substantially the entire ends of said utensil, said end plates each being bent outwardly to form outwardly extending shoulders, a tray having end flanges adapted to seat on said shoulders, said end plates being extended upwardly from said shoulders, parallel supporting members extending between and supported upon the upper ends of said end plates, electric heating coils extending between said parallel supporting members, and a grill cover having enclosing flanges fitting down over the outside of the upper ends of said end plates.

In witness whereof, I hereunto subscribe my name this 23 day of October, 1923.

FRANK L. KOHLHASE.

Witnesses:
J. DAVID DICKINSON,
FRANK J. LELIS.